US012763630B2

(12) United States Patent
Joshi et al.

(10) Patent No.: US 12,763,630 B2
(45) Date of Patent: Oct. 13, 2026

(54) AIRFOIL FINS FOR THE PASSIVE COOLING OF ELECTRONIC DEVICES ON ELECTRICAL AIRCRAFTS

(71) Applicant: Toyota Motor Engineering & Manufacturing North America, Inc., Plano, TX (US)

(72) Inventors: Shailesh Joshi, Ann Arbor, MI (US); Danny Lohan, Northville, MI (US); Ercan Dede, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 276 days.

(21) Appl. No.: 18/466,369

(22) Filed: Sep. 13, 2023

(65) Prior Publication Data

US 2025/0088066 A1 Mar. 13, 2025

(51) Int. Cl.

| | |
|---|---|
| ***H02K 5/18*** | (2006.01) |
| ***B64C 3/10*** | (2006.01) |
| ***B64D 33/08*** | (2006.01) |
| ***B64U 10/20*** | (2023.01) |

(52) U.S. Cl.

CPC ................. *H02K 5/18* (2013.01); *B64C 3/10* (2013.01); *B64D 33/08* (2013.01); *B64U 10/20* (2023.01); *B64U 2201/10* (2023.01)

(58) Field of Classification Search

CPC ............ B64U 2201/10; B64U 2201/20; B64U 2201/202; B64U 3/10; B64D 33/08; B64D 35/02; H02K 9/02; H02K 9/04; H02K 9/06; H02K 11/30; H02K 11/33; H02K 5/18; H02K 5/20; H02K 5/24; H02K 7/14; H02K 15/14; H02K 16/02

USPC ........... 310/63, 60 R, 58, 64, 62, 53, 55, 71, 310/68 R

See application file for complete search history.

(56) References Cited

U.S. PATENT DOCUMENTS

| | | | | |
|---|---|---|---|---|
| 3,181,545 A * | 5/1965 | Murphy, Jr. | H02K 3/30 | 137/838 |
| 4,674,704 A | 6/1987 | Altoz et al. | | |
| 7,633,176 B1 * | 12/2009 | Blittersdorf | F03D 15/20 | 290/55 |
| 8,001,764 B2 * | 8/2011 | Parks | F02K 5/02 | 244/54 |
| 9,346,542 B2 | 5/2016 | Leng | | |

(Continued)

FOREIGN PATENT DOCUMENTS

| | | |
|---|---|---|
| DE | 102016125656 | 2/2021 |

*Primary Examiner* — Maged M Almawri

(74) *Attorney, Agent, or Firm* — Dinsmore & Shohl LLP

(57) ABSTRACT

Impingement cooling systems, electronic motor assemblies, and electric vertical take-off and landing (eVTOL) systems are disclosed. In one embodiment, an impingement cooling system includes an electronic device casing downstream a propulsion air-flow and one or more electronic devices housed in the electronic device casing. A plurality of fins extend from the electronic device casing. At least one of the plurality of fins is an airfoil fin. The airfoil fin includes a high-pressure side with an air inlet that receives the propulsion air-flow. An inner conduit is fluidly coupled to the air inlet and directs the propulsion air-flow over the electronic device casing. A low-pressure side with an air outlet is fluidly coupled to the inner conduit. The air outlet expels the propulsion air-flow into the atmosphere.

20 Claims, 6 Drawing Sheets

(56) References Cited

U.S. PATENT DOCUMENTS

| | | | | |
|---|---|---|---|---|
| 9,415,878 | B2 | 8/2016 | Wetzel | |
| 9,764,833 | B1 | 9/2017 | Tighe et al. | |
| 9,868,524 | B2 * | 1/2018 | Welsh | B64U 50/13 |
| 9,974,209 | B1 * | 5/2018 | Taylor | B64C 1/00 |
| 10,336,451 | B2 * | 7/2019 | Saika | H01M 50/249 |
| 10,543,906 | B1 * | 1/2020 | Graber | H05K 7/20336 |
| 10,926,874 | B2 * | 2/2021 | Giannini | B64C 3/385 |
| 11,258,333 | B2 * | 2/2022 | Cottrell | H02K 1/20 |
| 11,387,693 | B2 * | 7/2022 | Hennig | B64D 33/08 |
| 11,794,888 | B1 * | 10/2023 | Taylor | B64C 39/024 |
| 11,891,186 | B2 * | 2/2024 | Jung | B64D 31/16 |
| 12,187,450 | B1 * | 1/2025 | Roller | B64U 50/19 |
| 2002/0014804 | A1 * | 2/2002 | Nelson | F04D 27/004<br>310/67 R |
| 2006/0248873 | A1 * | 11/2006 | Parks | F02K 5/00<br>60/269 |
| 2016/0294231 | A1 * | 10/2016 | Andres | H02K 5/18 |
| 2017/0001721 | A1 * | 1/2017 | Saika | B64U 20/87 |
| 2017/0167506 | A1 * | 6/2017 | Pesce | F04D 29/38 |
| 2017/0203839 | A1 * | 7/2017 | Giannini | B64C 39/12 |
| 2018/0086472 | A1 * | 3/2018 | Gore | B64U 20/00 |
| 2019/0078558 | A1 * | 3/2019 | Enevoldsen | F03D 80/40 |
| 2019/0263513 | A1 * | 8/2019 | Randall | B64C 27/22 |
| 2019/0329858 | A1 * | 10/2019 | Bevirt | B64D 29/02 |
| 2020/0052556 | A1 * | 2/2020 | Luo | H02K 7/14 |
| 2020/0195065 | A1 * | 6/2020 | Hennig | F04D 29/5806 |
| 2020/0325910 | A1 * | 10/2020 | Harada | B64U 30/26 |
| 2021/0036580 | A1 * | 2/2021 | Cottrell | B64U 10/13 |
| 2022/0393548 | A1 * | 12/2022 | Puttichaem | H02K 1/278 |
| 2022/0411075 | A1 * | 12/2022 | Silin | B64U 20/96 |
| 2023/0112852 | A1 * | 4/2023 | Sarlioglu | H02K 5/20<br>310/58 |
| 2023/0246513 | A1 * | 8/2023 | Silin | H02K 9/06<br>310/62 |
| 2023/0303263 | A1 * | 9/2023 | Schenk | H02K 7/14 |
| 2023/0312128 | A1 * | 10/2023 | Schenk | B64D 41/007<br>244/58 |
| 2025/0019083 | A1 * | 1/2025 | Iwatani | F04D 29/58 |

* cited by examiner

AIRFOIL FINS FOR THE PASSIVE COOLING OF ELECTRONIC DEVICES ON ELECTRICAL AIRCRAFTS

TECHNICAL FIELD

The embodiments described herein generally relate to a passive cooling system, in particular, to an airfoil fin cooling system in which propulsion air-flow is received by airfoil fins utilizing a pressure difference to direct air over an electronic device casing to cool various electronic devices.

BACKGROUND

Electric vertical take-off and landing (eVTOL) aircrafts may take off from a source location, e.g., with a load in the form of purchased goods, for delivery to a location, travel a certain distance in the air, drop off the load, and return to the source location. Operation of eVTOL aircrafts, however, suffer from deficiencies. For example, during take-off and landing operations, electronics included within the eVTOL aircrafts may experience sudden increases in operating temperatures due to increased power demands, which adversely impact the operational life of these devices, and by extension, the operational life of eVTOL aircrafts.

Accordingly, a need exists for alternative cooling systems to cool motors and various electronic devices of eVTOL aircrafts.

SUMMARY

In one embodiment, an airfoil cooling system is provided. The airfoil cooling system includes an electronic device casing configured to house one or more electronic devices. The electronic device casing is downstream a propulsion air-flow. A plurality of fins extend from the electronic device casing. At least one of the plurality of fins include an airfoil fin. The airfoil fin includes a high-pressure side with an air inlet that receives the propulsion air-flow, an inner conduit fluidly coupled to the air inlet that directs the propulsion air-flow over the electronic device casing, and a low-pressure side with an air outlet fluidly coupled to the inner conduit that expels the propulsion air-flow into the atmosphere.

In another embodiment, an electric motor assembly includes a motor housing having an end face and a motor within the motor housing. The electric motor assembly also includes a propulsion component coupled to the motor that generates a propulsion air-flow downstream the propulsion component. An electronics assembly is disposed on the end face of the motor housing. The electronics assembly includes an electronic device casing downstream the propulsion air-flow, configured to house one or more electronic devices. A plurality of fins extends from the electronic device casing. At least one of the plurality of fins include an airfoil fin. The airfoil fin includes a high-pressure side with an air inlet that receives the propulsion air-flow, an inner conduit fluidly coupled to the air inlet that directs the propulsion air-flow over the electronic device casing, and a low-pressure side with an air outlet fluidly coupled to the inner conduit that expels the propulsion air-flow into the atmosphere.

In yet another embodiment, an eVTOL system includes a motor housing having an end face. A motor is within the motor housing. At least one propeller is mechanically coupled to the motor. The propeller generates a propulsion air-flow downstream the propeller. An electronics assembly is disposed on the end face of the motor housing. The electronics assembly is downstream the propulsion air-flow and includes an electronic device casing configured to house one or more electronic devices. The electronic device casing includes a plurality of fins extending from the electronic device casing. At least one of the plurality of fins include an airfoil fin. The airfoil fin includes a high-pressure side with an air inlet that receives the propulsion air-flow, an inner conduit fluidly coupled to the air inlet that directs the propulsion air-flow over the electronic device casing, and a low-pressure side with an air outlet fluidly coupled to the inner conduit that expels the propulsion air-flow into the atmosphere.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to systems capable of cooling electronic devices. In embodiments, an airfoil cooling system includes an electronic device casing configured to house one or more electronic devices and a plurality of fins extending from the electronic device casing, where at least one of the plurality of fins is an airfoil fin. The airfoil fin receives a propulsion air-flow and provides the propulsion air-flow over the electronic device casing. This results in enhanced cooling of the electronic devices.

Electric vertical take-off and landing (eVTOL) aircrafts may provide a way of delivering people and goods to various locations in a cost and energy efficient manner. However, as stated above, eVTOL aircrafts suffer from cooling deficiencies. During specific operation conditions such as, e.g., take-off, landing, and hovering, operating temperatures of the electronic devices within eVTOL aircrafts may exceed threshold operational temperatures, namely threshold operational temperatures that are considered suitable for ensuring long operational life for these electronic devices.

Embodiments described herein are generally directed to airfoil cooling systems integrated into an electronic device casing. By utilizing propulsion air-flow, the airfoil cooling system provides the propulsion air-flow over the electronic device casing. The airfoil fin directing propulsion air-flow over the electronic device casing improves heat transfer between the electronic device casing and the surrounding environment. This allows the eVTOL aircraft to operate without exceeding threshold operational temperatures.

Embodiments described herein also include an electric motor assembly that includes a motor housed within a motor housing. The motor provides energy to a propulsion component. An electronics assembly includes the electronic device casing and the airfoil fin. The airfoil fin passes air-flow over the electronic device casing to cool the electronic devices.

The embodiments disclosed herein also describe an eVTOL system that utilizes airfoil fins to cool electronic devices of the eVTOL system. The eVTOL system utilizes its own propulsion air-flow, which is provided by at least one propeller, to cool the motor and electronic devices of the eVTOL system through use of the airfoil fin. The airfoil fin directing propulsion air-flow over the electronic device casing improves heat transfer between the electronic device casing and the surrounding environment. This allows the eVTOL aircraft to function without exceeding threshold operational temperatures.

As used herein, the following terms are generally defined in the manner below. The term "longitudinal" means a direction that is in line with the propulsion air-flow direction. The term "lateral" means a direction that is approximately 90 degrees from the propulsion air-flow direction.

Figure 1A:
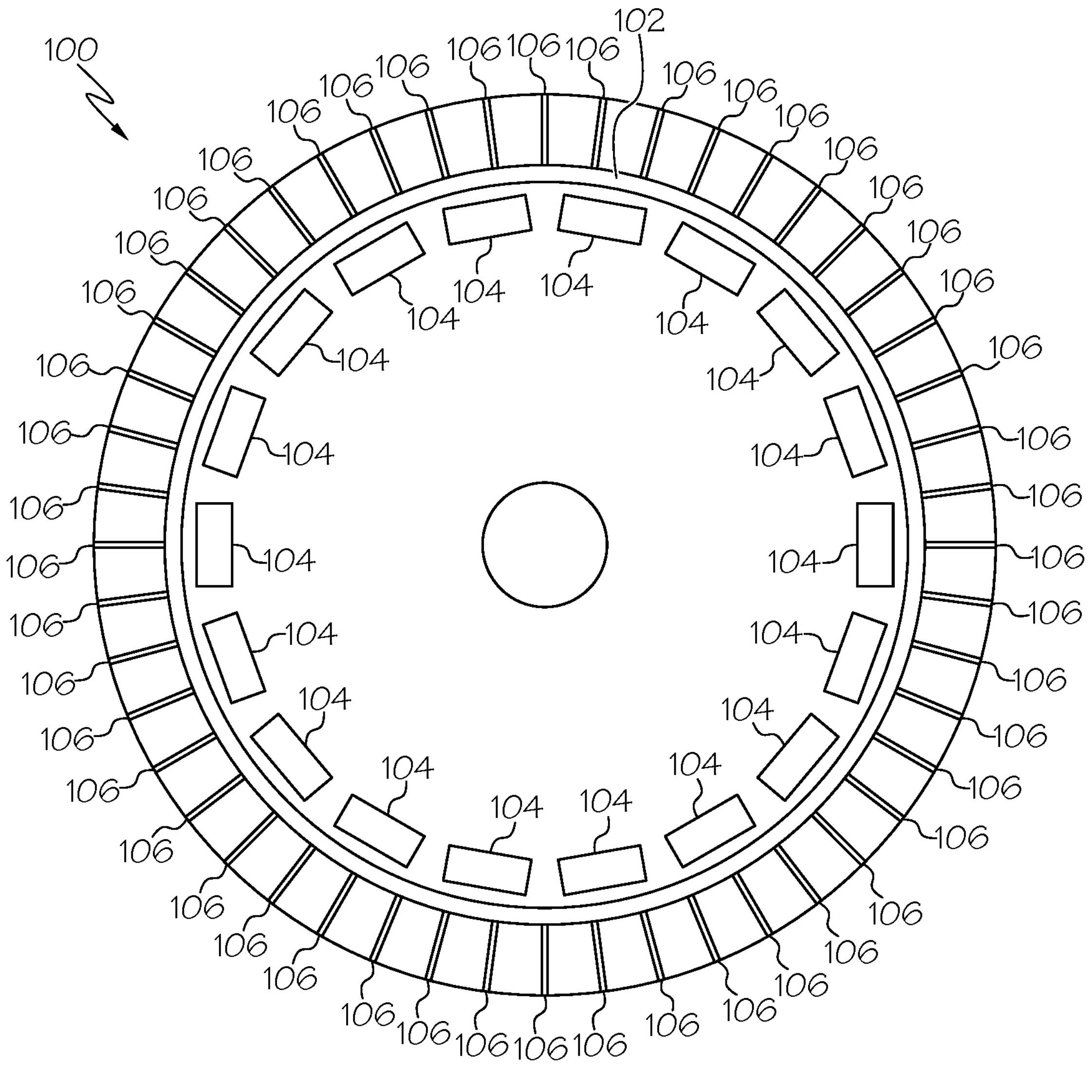
FIG. 1A schematically illustrates a top view of an airfoil cooling system included as part of an electronic device casing, according to one or more embodiments described and illustrated herein.
Figure 2:
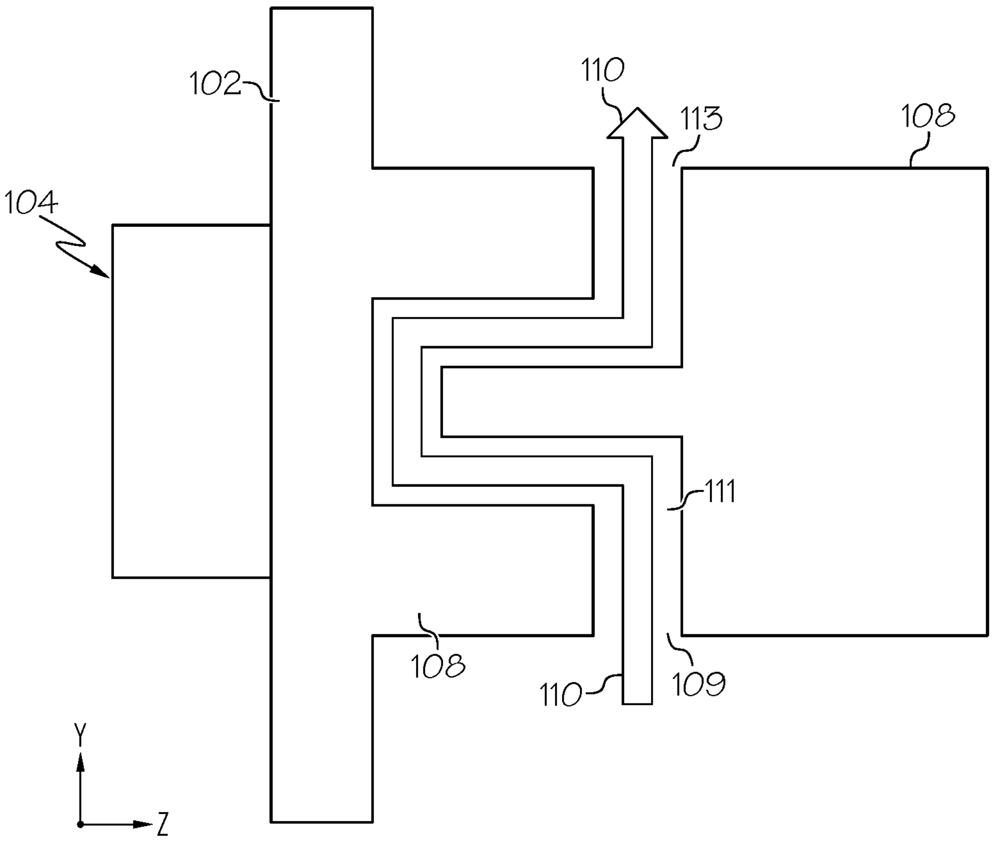
FIG. 2 schematically illustrates an air inlet, inner conduit, and air outlet of the airfoil fin, according to one or more embodiments described and illustrated herein.

Referring now to the drawings, FIG. 1A schematically depicts a top-view of an airfoil cooling system 100. The airfoil cooling system 100 is included as part of an electronic device casing 102. One or more electronic devices 104 are housed within the electronic device casing 102. A plurality of fins 106 extends from the electronic device casing 102. At least one of the plurality of fins 106 is an airfoil fin 108. The electronic device casing 102 is downstream a propulsion air-flow 110. The airfoil fin 108 (as depicted in FIG. 2) receives the propulsion air-flow 110 on a high-pressure side through an air inlet 109. An inner conduit 111 is fluidly coupled to the air inlet 109. The inner conduit 111 directs the propulsion air-flow 110 over the electronic device casing 102. The propulsion air-flow 110 is then expelled into the atmosphere through an air outlet 113 on a low-pressure side of the airfoil fin 108, which is fluidly coupled to the inner conduit 111.

Figure 1B:
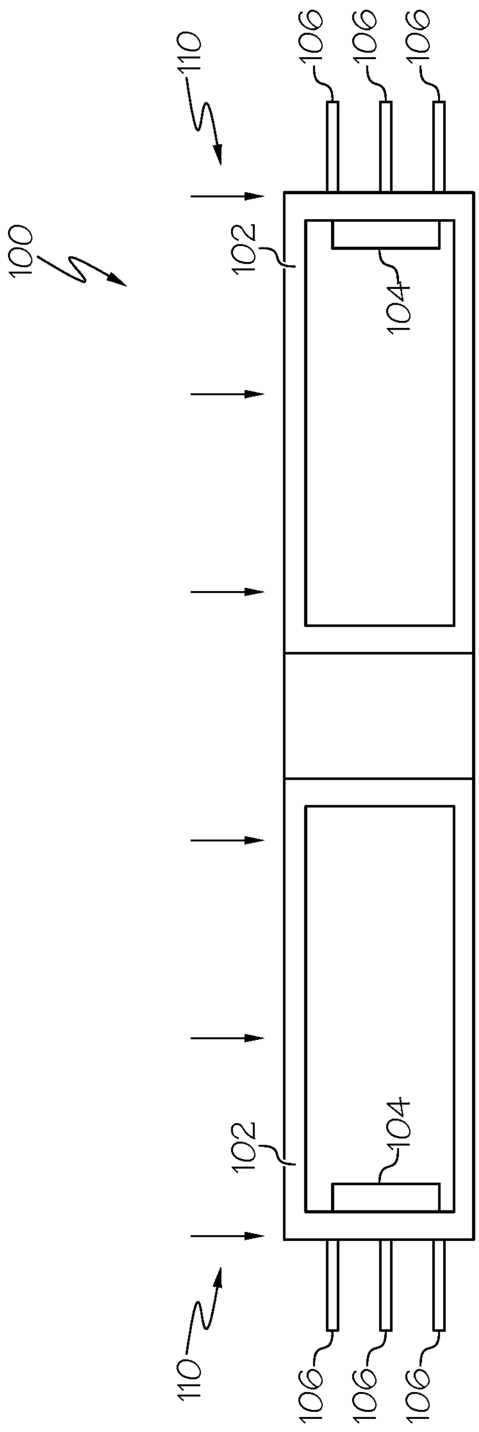
FIG. 1B schematically illustrates a side-view of an electronic device casing with a propulsion air-flow going over the electronic device casing, according to one or more embodiments described and illustrated herein.

FIG. 1B depicts a side-view of the airfoil cooling system 100. The electronic devices 104 are housed within the electronic device casing 102. The electronic device casing 102 is downstream the propulsion air-flow 110. In other embodiments, the electronic device casing 102 may be upstream the propulsion air-flow 110. The electronic devices 104 may include a motor, inverter circuits, power modules, controllers, capacitors, or any other suitable electronic device. The power modules may include power electronic devices, such as an insulated gate bipolar transistor that converts direct current (DC) power from a battery to alternating current (AC) power. The electronic devices 104 may be arranged so that the power modules are arranged around a circumference of the motor, around an inside wall of the electronic device casing 102, or in any suitable manner within the electronic device casing 102. The electronic device casing 102 may be circular, rectangular, or any shape suitable to house the electronic devices 104. The electronic devices 104 generate heat that is then transferred to the electronic device casing 102 and expelled into the atmosphere. The electronic device casing 102 may be made up of a thermally conductive material, such as aluminum or copper. In some embodiments, the electronic device casing 102 is integrated into an eVTOL system 600 (discussed below).

As stated above, the electronic device casing 102 also includes the plurality of fins 106. The plurality of fins 106 extend from the electronic device casing 102. The plurality of fins 106 may be coupled to the electronic device casing 102 through bolts, screws, adhesive, or any other suitable coupling means. The plurality of fins 106 may also be integrated into and cast as part of the electronic device casing 102. The plurality of fins 106 may extend from the electronic device casing 102 in varying frequencies. There may be any number of the plurality of fins 106 extending from the electronic device casing 102. The plurality of fins 106 may be spaced out evenly or in varying frequencies. The plurality of fins 106 may also be layered above or beneath one another.

The plurality of fins 106 are configured to improve cooling of the electronic device casing 102 and, thus, improve cooling of the electronic devices 104. The electronic devices 104 generate heat to the electronic device casing 102 and the plurality of fins 106 provide an increased surface area for heat to dissipate from the electronic device casing 102. The plurality of fins 106 may be longitudinal fins, lateral fins, or curved fins.

As stated above, the plurality of fins 106 also include one or more airfoil fin 108. Referring to FIG. 2, the airfoil fin 108 includes the air inlet 109, the inner conduit 111 fluidly coupled to the air inlet 109, and the air outlet 113 fluidly coupled to the inner conduit 111. The airfoil fin 108 creates a pressure difference that draws the propulsion air-flow 110 into the inner conduit 111 and, thus, over the electronic device casing 102. The air inlet 109 is on the high-pressure side of the airfoil fin 108 and brings the propulsion air-flow 110 into the inner conduit 111. The inner conduit 111 directs the propulsion air-flow 110 over the electronic device casing 102, drawing heat from the electronic device casing 102 generated by the electronic devices 104. The inner conduit 111 then directs the propulsion air-flow 110 warmed by the electronic device casing 102 through the air outlet 113 on the low-pressure side of the airfoil fin 108. The air outlet 113 leads to the atmosphere.

The airfoil fin 108 may have a plurality of air inlets or a plurality of air outlets. These air inlets and air outlets may be connected to a single inner conduit, or a plurality of inner conduits. The propulsion air-flow 110 may flow through the inner conduit 111 as turbulent air-flow, or any other air-flow suitable to draw heat from the electronic device casing 102.

Figure 3:
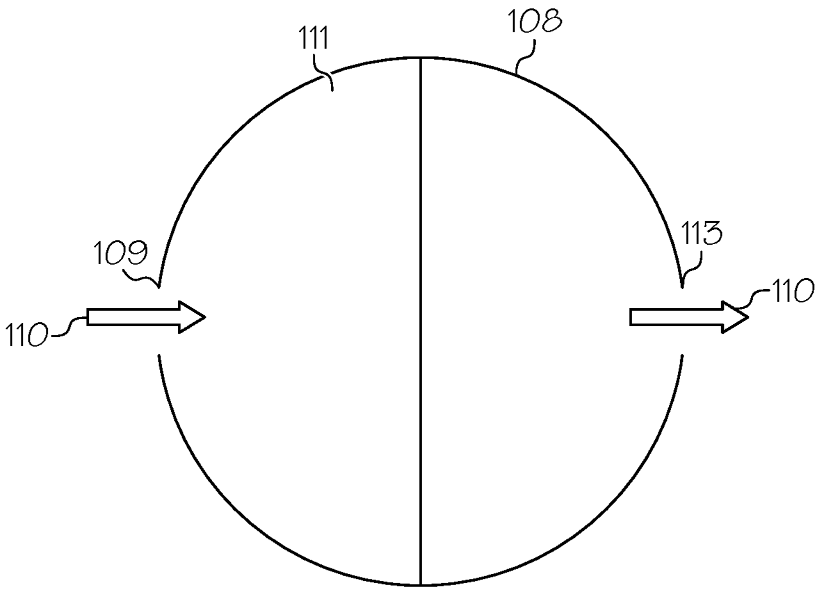
FIG. 3 schematically illustrates a cross-sectional area of a circular shaped airfoil fin, according to one or more embodiments described and illustrated herein.
Figure 4:
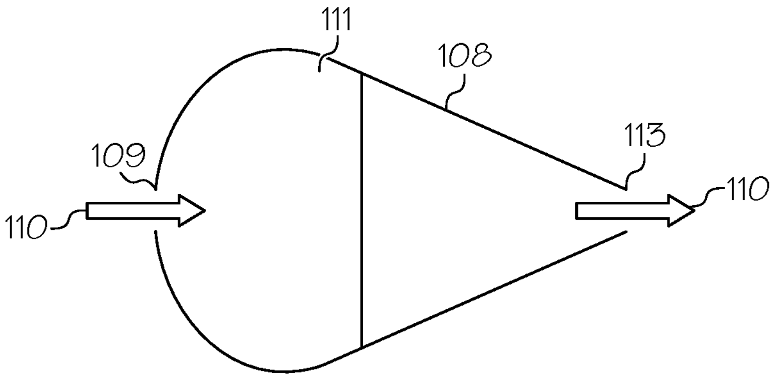
FIG. 4 schematically illustrates a cross-sectional area of a tear-dropped shaped airfoil fin, according to one or more embodiments described and illustrated herein.

The airfoil fin 108 may be any shape capable of producing the high-pressure side and the low-pressure side. The airfoil fin 108 may have a curved shape. Referring to FIG. 3, the airfoil fin 108 may also be circular in shape. In other embodiments, as depicted by FIG. 4, the airfoil fin 108 may be tear-dropped in shape. The inner conduit 111 may have an inner diameter of less than 6 centimeters, or any other suitable diameter for the airfoil fin 108. The inner diameter of the inner conduit 111 may depend on dimensions of the airfoil fin 108. The larger the airfoil fin 108, the larger the inner diameter of the inner conduit 111.

The airfoil fin 108 directs the propulsion air-flow 110 next to the electronic devices 104 housed in the electronic device casing 102, drawing heat generated by the electronic devices 104 and expelling the heat into the atmosphere. The inner conduit 111 may direct the propulsion air-flow 110 over the electronic device casing 102 in any suitable direction. In some embodiments, the inner conduit 111 directs the propulsion air-flow 110 longitudinally over the electronic device casing 102. In other embodiments, the inner conduit 111 directs the propulsion air-flow 110 laterally over the electronic device casing 102.

Figure 5:
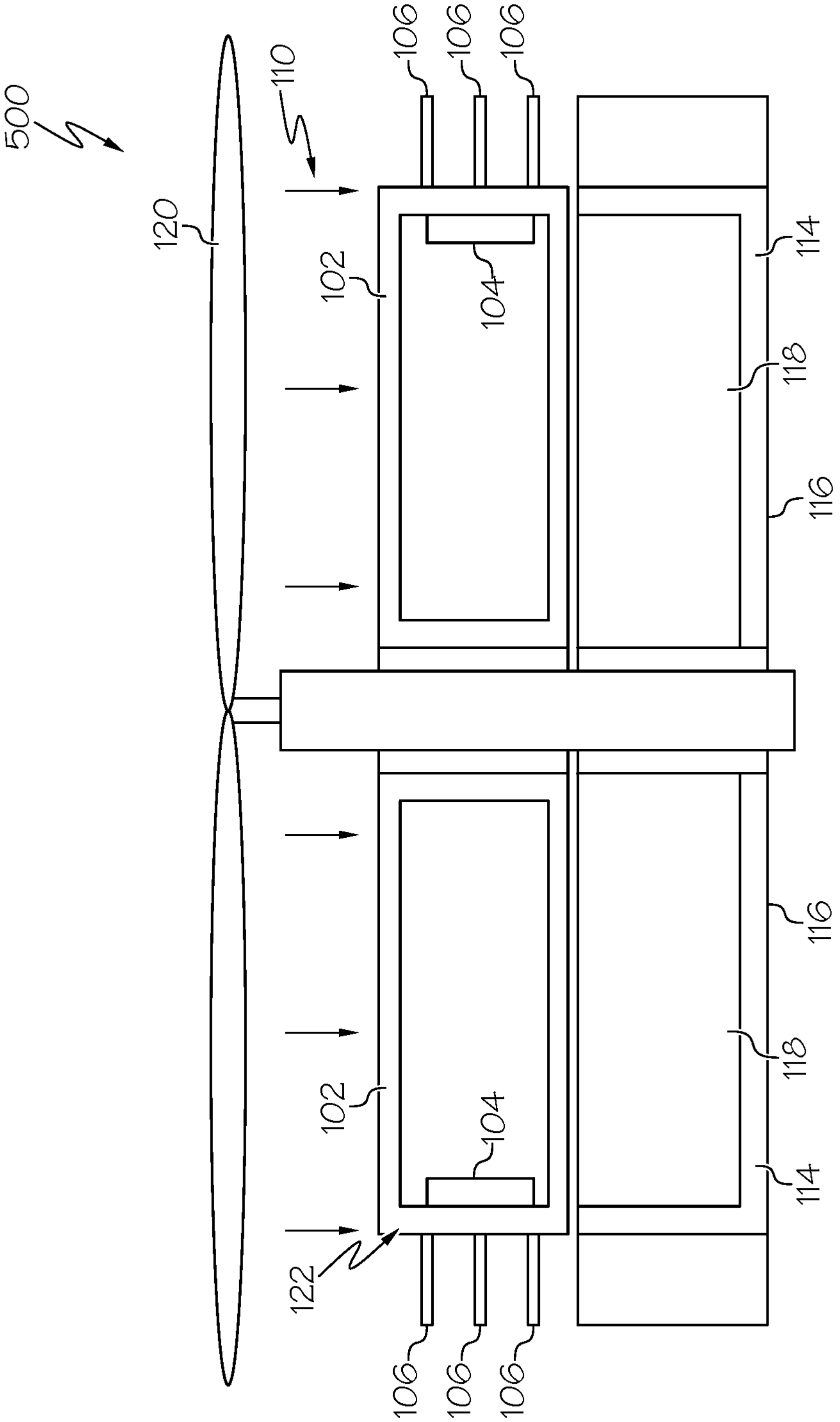
FIG. 5 schematically illustrates a side-view of an electric motor assembly, according to one or more embodiments described and illustrated herein.

In some embodiments, an electric motor assembly 500 is disclosed, as depicted in FIG. 5. The electric motor assembly 500 includes a motor housing 114. The motor housing 114 has an end face 116. A motor 118 is housed within the motor housing 114. A propulsion component 120 that generates the propulsion air-flow 110 is coupled to the motor 118. An electronics assembly 122 is disposed on the end face 116 of the motor housing 114. The electronics assembly 122 includes the electronic device casing 102 that houses the one or more electronic devices 104. The plurality of fins 106 extend from the electronic device casing 102. At least one of the plurality of fins 106 is the airfoil fin 108. The airfoil fin 108 (as depicted in FIG. 2) receives the propulsion air-flow 110 on a high-pressure side through an air inlet 109. An inner conduit 111 is fluidly coupled to the air inlet 109. The inner conduit 111 directs the propulsion air-flow 110 over the electronic device casing 102. The propulsion air-flow 110 is then expelled into the atmosphere through an air outlet 113 on a low-pressure side of the airfoil fin 108, which is fluidly coupled to the inner conduit 111.

The motor 118 is housed in the motor housing 114. The motor 118 may be coupled to the motor housing 114 through bolts, screws, adhesive, or any other suitable coupling means. The motor 118 may be a DC motor, an AC motor, or any other suitable electric motor. The motor 118 may be coupled to the electronic devices 104, such as the power module. The power module may be rechargeable, exchangeable, or both. The motor 118 is also coupled to the propulsion component 120 in order to provide power to the propulsion component 120.

The propulsion component 120 may be a propeller, a turbofan, a turbine, or any other device capable of producing an air-flow. The propulsion component 120 utilizes surrounding air to generate the propulsion air-flow 110. The electronic device casing 102 and the plurality of fins 106 are downstream the propulsion air-flow 110. Thus, the propulsion air-flow 110 flows over the electronic device casing 102 and the plurality of fins 106, drawing heat generated by the electronic devices 104 away from the electronic device casing 102 and the plurality of fins 106 and expelling it into the atmosphere. The airfoil fin 108 is also downstream the propulsion air-flow 110 so that the airfoil fin 108 receives the propulsion air-flow 110 at the air inlet 109 and directs the propulsion air-flow 110 over the electronic device casing 102 through the inner conduit 111, further expelling heat generated by the electronic devices 104 and the motor 118. The propulsion air-flow 110 is then expelled into the atmosphere via the air outlet 113.

Figure 6:
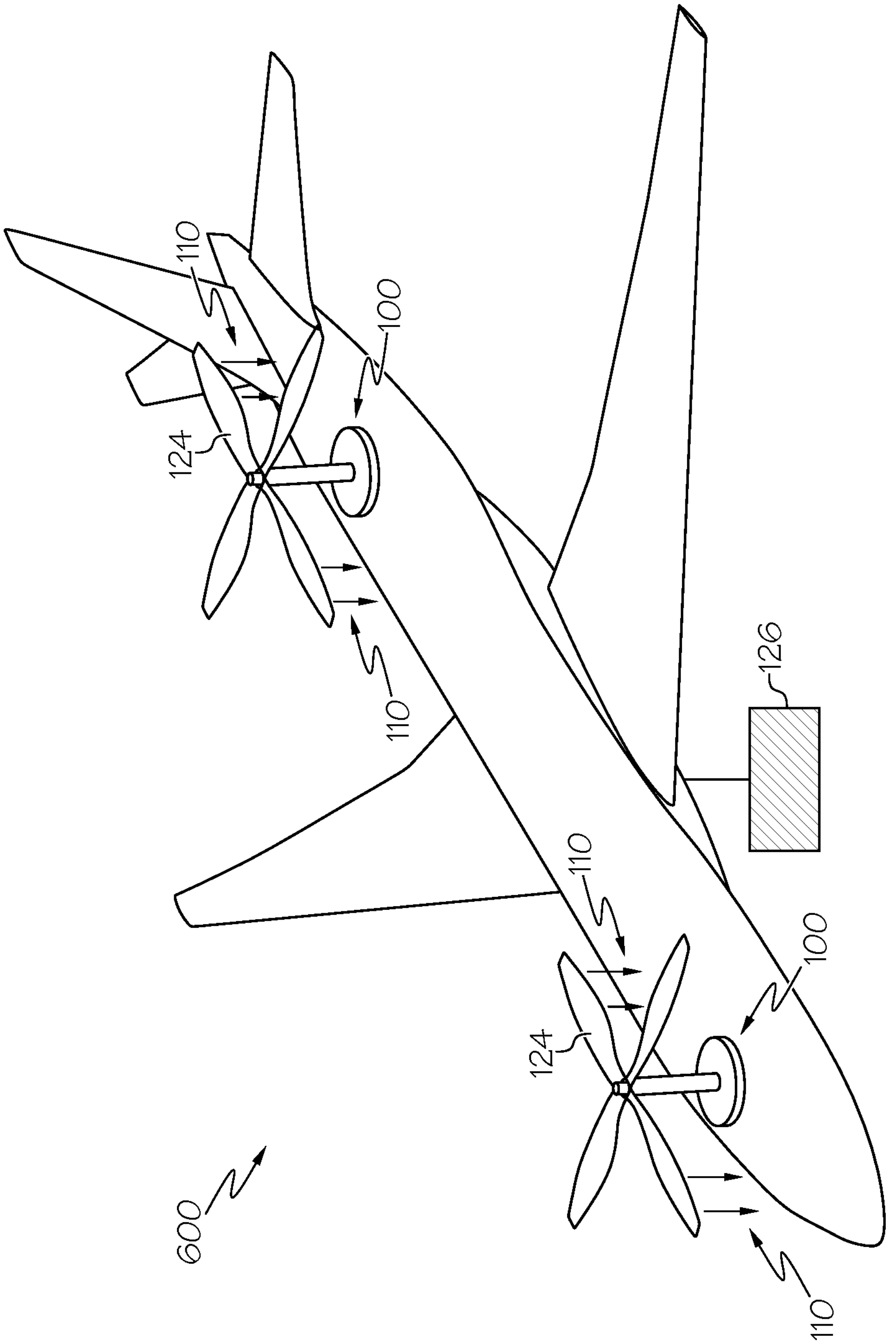
FIG. 6 schematically illustrates an eVTOL aircraft, according to one or more embodiments described and illustrated herein.

Now referring to FIG. 6, in some embodiments, the eVTOL system 600 includes the motor housing 114 with the end face 116. The motor 118 is housed within the motor housing 114. At least one propeller 124 is mechanically coupled to the motor 118. The at least one propeller 124 generates the propulsion air-flow 110 downstream the at least one propeller 124. The eVTOL system 600 further includes the electronics assembly 122 disposed on the end face 116 of the motor housing 114. The electronics assembly 122 includes the electronic device casing 102 that houses the one or more electronic devices 104. The plurality of fins 106 extend from the electronic device casing 102. At least one of the plurality of fins 106 is the airfoil fin 108. The airfoil fin 108 (as depicted in FIG. 2) receives the propulsion air-flow 110 on a high-pressure side through an air inlet 109. An inner conduit 111 is fluidly coupled to the air inlet 109. The inner conduit 111 directs the propulsion air-flow 110 over the electronic device casing 102. The propulsion air-flow 110 is then expelled into the atmosphere through an air outlet 113 on a low-pressure side of the airfoil fin 108, which is fluidly coupled to the inner conduit 111.

The eVTOL system 600 may be capable of carrying a load 126, passengers, or a combination thereof. The eVTOL system 600 may be controlled in a variety of manners. In some embodiments, the eVTOL system 600 may be controlled through the use of a user controller. The controller may be any device that a user can manipulate to control the eVTOL system 600. The controller may also be integrated into a user device, such as in an application on the user device that the user can interact with to control the eVTOL system 600. The eVTOL system 600 may also be autonomous. The eVTOL system 600 may be controlled in accordance with a predefined set of instructions. The eVTOL system 600 may also integrate machine-learning. The eVTOL system 600 may adjust its predefined set of instructions based on previous trips/iterations.

It should now be understood that embodiments of the present disclosure are directed to assemblies and systems that provide enhanced cooling of electronics of an aircraft. Airfoil fins may cool motors and electronic devices within aircrafts, specifically, within eVTOL aircrafts. The airfoil fins may be integrated into an electronic device casing and provide increased air-flow over the electronic device casing, dissipating heat produced by the motor and electronic devices. This allows for continuous operation of the aircraft, even when the motor and electronic devices are subject to increased power demands, and increased operational life of aircraft components.

It is noted that recitations herein of a component of the present invention being "configured" in a particular way, "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising".

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. An airfoil cooling system comprising:

an electronic device casing configured to house one or more electronic devices, wherein the electronic device casing is downstream a propulsion air-flow;

a plurality of fins extending from the electronic device casing, wherein at least one of the plurality of fins comprise an airfoil fin comprising:

a high-pressure side comprising an air inlet that receives the propulsion air-flow;

an inner conduit fluidly coupled to the air inlet running over a portion of the electronic device casing, wherein the inner conduit directs the propulsion air-flow over the portion of the electronic device casing; and a low-pressure side comprising an air outlet fluidly coupled to the inner conduit, wherein the air outlet expels the propulsion air-flow into the atmosphere.

2. The airfoil cooling system of claim 1, wherein the airfoil fin is circular in shape.

3. The airfoil cooling system of claim 1, wherein the airfoil fin is tear-dropped in shape.

4. The airfoil cooling system of claim 1, wherein the plurality of fins are casted as part of the electronic device casing.

5. The airfoil cooling system of claim 1, wherein the electronic device casing is integrated into an Electric Vertical Takeoff and Landing (eVTOL) system.

6. The airfoil cooling system of claim 1, wherein the inner conduit has an inner diameter of less than 6 centimeters.

7. The airfoil cooling system of claim 1, wherein the inner conduit directs the propulsion air-flow longitudinally over the electronic device casing.

8. The airfoil cooling system of claim 1, wherein the inner conduit directs the propulsion air-flow laterally over the electronic device casing.

9. The airfoil cooling system of claim 1, wherein the high-pressure side comprises a plurality of air inlets.

10. The airfoil cooling system of claim 1, wherein the low-pressure side comprises a plurality of air outlets.

11. The airfoil cooling system of claim 1, wherein the propulsion air-flow within the inner conduit is turbulent air-flow.

12. An electric motor assembly comprising:

a motor housing having an end face;

a motor within the motor housing;

a propulsion component coupled to the motor, wherein the propulsion component generates a propulsion air-flow downstream the propulsion component; and an electronics assembly disposed on the end face of the motor housing, the electronics assembly comprising:

an electronic device casing configured to house one or more electronic devices, wherein the electronic device casing is downstream the propulsion air-flow;

a plurality of fins extending from the electronic device casing, wherein at least one of the plurality of fins comprise an airfoil fin comprising:

a high-pressure side comprising an air inlet that receives the propulsion air-flow;

an inner conduit fluidly coupled to the air inlet running over a portion of the electronic device casing, wherein the inner conduit directs the propulsion air-flow over the portion of the electronic device casing; and a low-pressure side comprising an air outlet fluidly coupled to the inner conduit, wherein the air outlet expels the propulsion air-flow into the atmosphere.

13. The electric motor assembly of claim 12, wherein the propulsion component is a propeller.

14. The electric motor assembly of claim 12, wherein the one or more electronic devices is a power module.

15. The electric motor assembly of claim 12, wherein the airfoil fin has a curved surface.

16. An Electric Vertical Takeoff and Landing (eVTOL) system comprising:

a motor housing having an end face;

a motor within the motor housing;

at least one propeller mechanically coupled to the motor, wherein the at least one propeller generates a propulsion air-flow downstream the at least one propeller; and an electronics assembly disposed on the end face of the motor housing, the electronics assembly comprising:

an electronic device casing configured to house one or more electronic devices, wherein the electronic device casing is downstream the propulsion air-flow;

a plurality of fins extending from the electronic device casing, wherein at least one of the plurality of fins comprise an airfoil fin comprising:

a high-pressure side comprising an air inlet that receives the propulsion air-flow;

an inner conduit fluidly coupled to the air inlet running over a portion of the electronic device casing, wherein the inner conduit directs the propulsion air-flow over the portion of the electronic device casing; and a low-pressure side comprising an air outlet fluidly coupled to the inner conduit, wherein the air outlet expels the propulsion air-flow into the atmosphere.

17. The eVTOL system of claim 16, wherein the airfoil fin is tear-dropped in shape.

18. The eVTOL system of claim 16, wherein the eVTOL system is capable of carrying a load of at least 25 pounds.

19. The eVTOL system of claim 16, wherein the eVTOL system is controlled through a user controller.

20. The eVTOL system of claim 16, wherein the eVTOL system is autonomous.

* * * * *